(12) United States Patent
Hundemer (10) Patent No.: US 9,979,770 B2
(45) Date of Patent: May 22, 2018

(54) METHOD OF REQUESTING A SOCIAL MEDIA LINK AUTHORIZATION BASED ON A SOCIAL MEDIA CONTENT ITEM

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days. days.

(21) Appl. No.: 15/211,149

(22) Filed: Jul. 15, 2016

(65) Prior Publication Data

US 2017/0019696 A1    Jan. 19, 2017

Related U.S. Application Data

(60) Provisional application No. 62/242,593, filed on Oct. 16, 2015, provisional application No. 62/194,171, filed on Jul. 17, 2015.

(51) Int. Cl.
*H04L 29/06* (2006.01)
*G11B 27/00* (2006.01)
(Continued)

(52) U.S. Cl.
CPC .......... *H04L 65/607* (2013.01); *G06F 3/0482* (2013.01); *G06F 3/0486* (2013.01); *G06F 17/248* (2013.01); *G11B 27/00* (2013.01); *H04L 51/10* (2013.01); *H04L 51/32* (2013.01); *H04L 65/4076* (2013.01); *H04L 65/602* (2013.01); *H04L 65/604* (2013.01); *H04L 67/02* (2013.01); *H04L 67/10* (2013.01); *H04L 67/18* (2013.01); *H04L 67/306* (2013.01); *H04L 67/42* (2013.01); *H04N 21/23424* (2013.01);
(Continued)

(58) Field of Classification Search
None
See application file for complete search history.

(56) References Cited

U.S. PATENT DOCUMENTS

2008/0020814 A1* 1/2008 Kernene .............. H04N 21/235
463/10
2010/0121849 A1   5/2010 Goeldi
(Continued)

OTHER PUBLICATIONS https://en.wikipedia.org/wiki/Meerkat_(app); Wikipedia Article on Meerkat (app); published May 29, 2015; retrieved Sep. 28, 2016.
(Continued)

*Primary Examiner* — Hoang Vu A Nguyen Ba
(74) *Attorney, Agent, or Firm* — McDonnell Boehnen Hulbert & Berghoff LLP (57) ABSTRACT

In one aspect, an example method includes (i) accessing, by a computing system, data associated with a program schedule for a media program; (ii) based on the accessed data, selecting, by the computing system, a social media (SM) content item, wherein the SM content item was published by a SM user, and wherein the SM user is associated with a first SM account; and (iii) responsive to selecting the SM content item, causing, by the computing system, a SM platform to request the SM user to authorize a link between the first SM account and a second SM account.

20 Claims, 6 Drawing Sheets

(51) Int. Cl.
| | |
|---|---|
| *H04L 12/58* | (2006.01) |
| *H04N 21/854* | (2011.01) |
| *H04L 29/08* | (2006.01) |
| *G06F 3/0482* | (2013.01) |
| *H04N 21/2665* | (2011.01) |
| *H04N 21/234* | (2011.01) |
| *H04N 21/84* | (2011.01) |
| *H04N 21/262* | (2011.01) |
| *G06F 17/24* | (2006.01) |
| *G06F 3/0486* | (2013.01) |

(52) U.S. Cl.
CPC ....... *H04N 21/262* (2013.01); *H04N 21/2665* (2013.01); *H04N 21/84* (2013.01); *H04N 21/854* (2013.01)

(56) References Cited

U.S. PATENT DOCUMENTS

| | | |
|---|---|---|
| 2011/0040760 A1 | 2/2011 | Fleischman et al. |
| 2012/0174157 A1* | 7/2012 | Stinson, III ........ H04N 5/44543 725/40 |
| 2012/0254917 A1* | 10/2012 | Burkitt .............. G06F 17/30817 725/40 |
| 2013/0139193 A1* | 5/2013 | Fan ........................ H04N 7/157 725/14 |
| 2013/0268962 A1 | 10/2013 | Snider et al. |
| 2013/0304818 A1 | 11/2013 | Brumleve et al. |
| 2014/0040371 A1 | 2/2014 | Gurevich et al. |
| 2014/0125703 A1 | 5/2014 | Roveta et al. |
| 2014/0280564 A1 | 9/2014 | Darling et al. |

OTHER PUBLICATIONS https://en.wikipedia.org/wiki/Periscope_(app); Wikipedia Article on Periscope (app); published May 26, 2015; retrieved Sep. 28, 2016.
https://about.tagboard.com/live; Tagboard Live Webpage; published Mar. 15, 2015; retrieved Sep. 28, 2016.
https://techcrunch.com/2013/11/25/tagboard-2-0/; Tagboard Revamps Its Cross-Platform Hashtag Aggregator; Anthony Ha; published Nov. 25, 2013; retrieved Sep. 28, 2016.
https://beta.stringr.com; Stringr Homepage; published Apr. 13, 2015; retrieved Sep. 28, 2016.
https://www.vidpresso.com/social; Vidpresso Social Homepage; published Jun. 27, 2015; retrieved Sep. 28, 2016.
https://techcrunch.com/2013/04/03/vidpresso-adds-photo-touch-screen-support-to-help-bring-twitter-to-tv/; Vidpresso Adds Photo, Touchscreen Support to Help Bring Twitter to TV; Ryan Lawler; published Apr. 3, 2013; retrieved Sep. 28, 2016.
https://techcrunch.com/2012/05/07/vidpresso-wants-to-help-tv-stations-put-your-tweets-and-facebook-comments-on-air/; Vidpresso Wants to Help TV Stations Put Your Tweets and Facebook Comments on Air; Frederic Lardinois; published May 7, 2012; retrieved Sep. 28, 2016.
https://techcrunch.com/2014/03/03/vidpresso-ads/; Ads to Broadcast TV; Ryan Lawler; published Mar. 3, 2014; retrieved Sep. 28, 2016.

* cited by examiner

| Story Title | Video Content Item Identifier | Duration | DVE Identifier |
|---|---|---|---|
| STORY A | VCI ID A | 00:02:00:00 | DVE ID A |
| STORY B | VCI ID B | 00:01:30:00 | |
| STORY C | | 00:00:30:00 | |
| STORY D | VCI ID D | 00:00:30:00 | |
| STORY E | VCI ID E | 00:00:30:00 | |
| COMMERCIAL BREAK | | | |
| STORY F | VCI ID F | 00:02:00:00 | DVE ID F |
| STORY G | | 00:01:30:00 | |
| STORY H | VCI ID H | 00:00:30:00 | |
| STORY I | VCI ID I | 00:00:30:00 | |

METHOD OF REQUESTING A SOCIAL MEDIA LINK AUTHORIZATION BASED ON A SOCIAL MEDIA CONTENT ITEM

RELATED DISCLOSURES

This disclosure claims priority to (i) U.S. Provisional Patent Application No. 62/194,171, titled "Video Production System with Social Media Features," filed on Jul. 17, 2015, and (ii) U.S. Provisional Patent Application No. 62/242,593, titled "Video Production System with Content-Related Features," filed on Oct. 16, 2015, both of which are hereby incorporated by reference in their entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) accessing, by a computing system, data associated with a program schedule for a media program; (ii) based on the accessed data, selecting, by the computing system, a social media (SM) content item, wherein the SM content item was published by a SM user, and wherein the SM user is associated with a first SM account; and (iii) responsive to selecting the SM content item, causing, by the computing system, a SM platform to request the SM user to authorize a link between the first SM account and a second SM account.

In another aspect, an example non-transitory computer-readable medium is disclosed. The computer-readable medium has stored thereon program instructions that upon execution by a processor, cause performance of a set of acts including (i) accessing, by a computing system, data associated with a program schedule for a media program; (ii) based on the accessed program schedule data, selecting, by the computing system, a SM content item, wherein the SM content item was published by a SM user, and wherein the SM user is associated with a first SM account; and (iii) responsive to selecting the SM content item, causing, by the computing system, a SM platform to request the SM user to authorize a link between the first SM account and a second SM account.

In another aspect, an example computing system is disclosed. The computing system is configured for performing a set of acts including (i) accessing, by the computing system, data associated with a program schedule for a media program; (ii) based on the accessed program schedule data, selecting, by the computing system, a SM content item, wherein the SM content item was published by a SM user, and wherein the SM user is associated with a first SM account; and (iii) responsive to selecting the SM content item, causing, by the computing system, a SM platform to request the SM user to authorize a link between the first SM account and a second SM account.

DETAILED DESCRIPTION

I. Overview

A video-production system (VPS) can generate video content that can serve as or be part of a video program (e.g., a news program). The VPS can then transmit the video content to a video-broadcast system (VBS), which in turn can transmit the video content to an end-user device for presentation of the video content to an end-user.

The VPS can include various components to facilitate generating video content. For example, the VPS can include a video source, a DVE system, a scheduling system, and a sequencing system. The video source can generate video content, and can transmit the video content to the DVE system. The DVE system can use the video content and a DVE template to execute a DVE, which can cause the DVE system to generate new video content that is a modified version of the received video content. For example, the generated video content can include the received video content with local weather content overlaid thereon.

The scheduling system can create a program schedule, perhaps based on input received from a user (e.g., a producer or technical director) via a user interface. The sequencing system can process records in the program schedule, and based on the processed records, can control one or more components of the VPS, such as the video source and the DVE system, to facilitate generating video content.

In one example, the VPS can also include a SM system and a character generator. The SM system can obtain a SM content item, and the character generator can then use the SM content item to generate video content that includes the SM content item. Further, the character generator can transmit the video content to the DVE system. The DVE system can receive the video content and can execute a DVE, which causes the DVE system to generate video content that includes the received video content and thus, that also includes the SM content item. The generated video content can serve as or be part of a video program. Thus, in this way, the VPS can integrate a SM content item into a video program.

As noted above, the VPS can use a program schedule to facilitate the process of generating a video program. However, the VPS can also use the program schedule for other purposes, such as to provide features related to SM accounts.

A SM user can establish a SM account with a SM platform. Among other things, this can allow the SM user to publish a SM content item on the SM platform through the SM account. In some cases, a first SM account can be linked with a second SM account. The link can be established in various ways. For example, a first SM user associated with the first SM account can cause a SM platform to request a second SM user associated with the second SM account to authorize a link between the first and second SM accounts. The link request (and related concepts) can be referred to in various ways depending on the associated SM platform. For instance, in the case where the SM accounts are FACE- BOOK accounts, the request may be referred to as a "friend request." As a result of the first SM account being linked to the second SM account, certain options may become available to or both of the SM accounts and/or their respective users.

As noted above, the VPS can use the program schedule to provide features related to SM accounts. In one example, the VPS can use a program schedule to select a SM content item, and to facilitate the process of establishing a link between a first SM account associated with the selected SM content item, and a second SM account, which can be associated with the VPS (or a user thereof). This can allow the VPS to gain access to additional potentially relevant SM content items, which the VPS can integrate into a video program as described above.

To provide such functionality, the SM system can access data associated with a program schedule. The accessed data can be data that is included in the program schedule. The accessed data can identify or otherwise relate to various types of information, such as a person, place, event, or topic. Based on the accessed data, the SM system can select a SM content item that was published by a first SM user associated with a first SM account. Then, responsive to selecting the SM content item, the SM system can cause a SM platform to request the first SM user to authorize a link between the first SM account and a second SM account.

After the first SM user authorizes the link, a server of the SM platform can transmit to the SM system an indication that the first SM user authorized the link between the first SM account and the second SM account. The SM system can receive this instruction, and responsive to receiving it, the SM system can perform an action. For example, the SM system can obtain a SM content item published through the first SM account, and that became accessible as a result of the link being established. The VPS can then integrate the SM content item into a video program as described above.

II. Example Architecture

A. Computing Device

Figure 1:
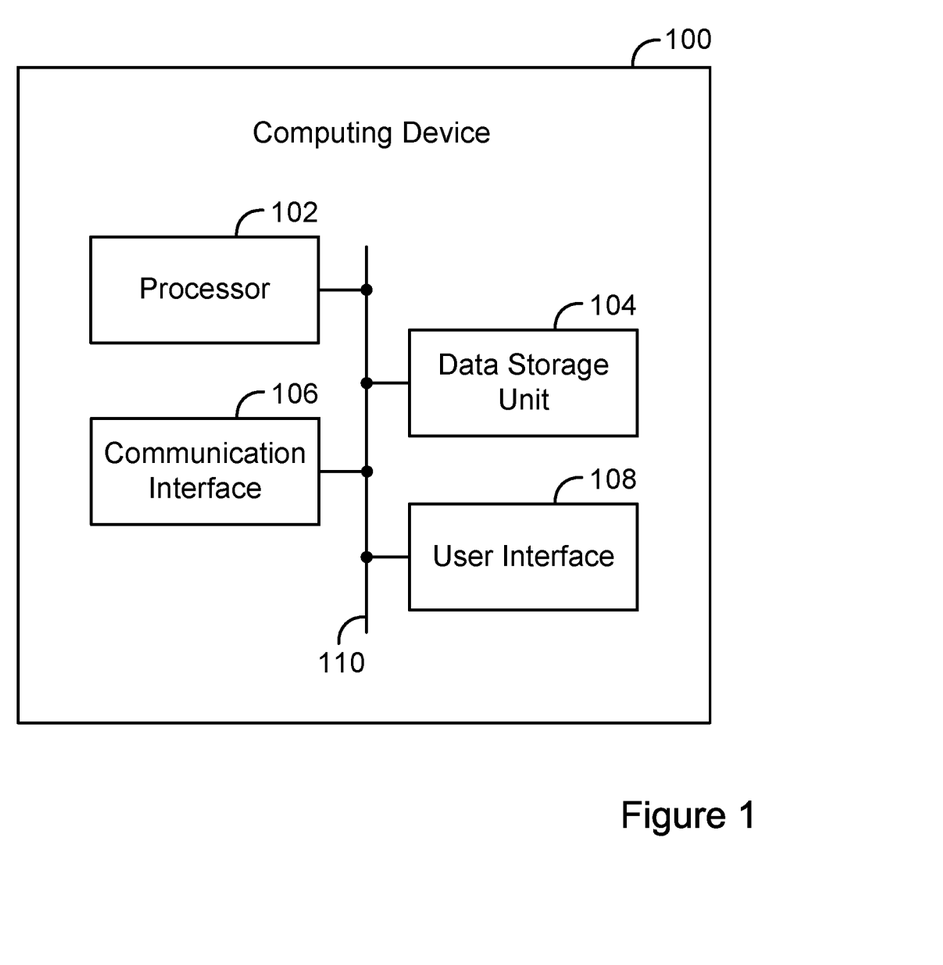
FIG. 1 is a simplified block diagram of an example computing device.

FIG. 1 is a simplified block diagram of an example computing device 100. The computing device can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions contained in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define and/or be part of a discrete software application. In some instances, the computing device 100 can execute program instructions in response to receiving an input, such as from the communication interface 106 and/or the user interface 108. The data storage unit 104 can also store other types of data, such as those types described in this disclosure.

The communication interface 106 can allow the computing device 100 to connect with and/or communicate with another other entity according to one or more protocols. In one example, the communication interface 106 can be a wired interface, such as an Ethernet interface or a high-definition serial-digital-interface (HD-SDI). In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, a mobile phone, a set-top box, and/or a television.

B. Video System

Figure 2:
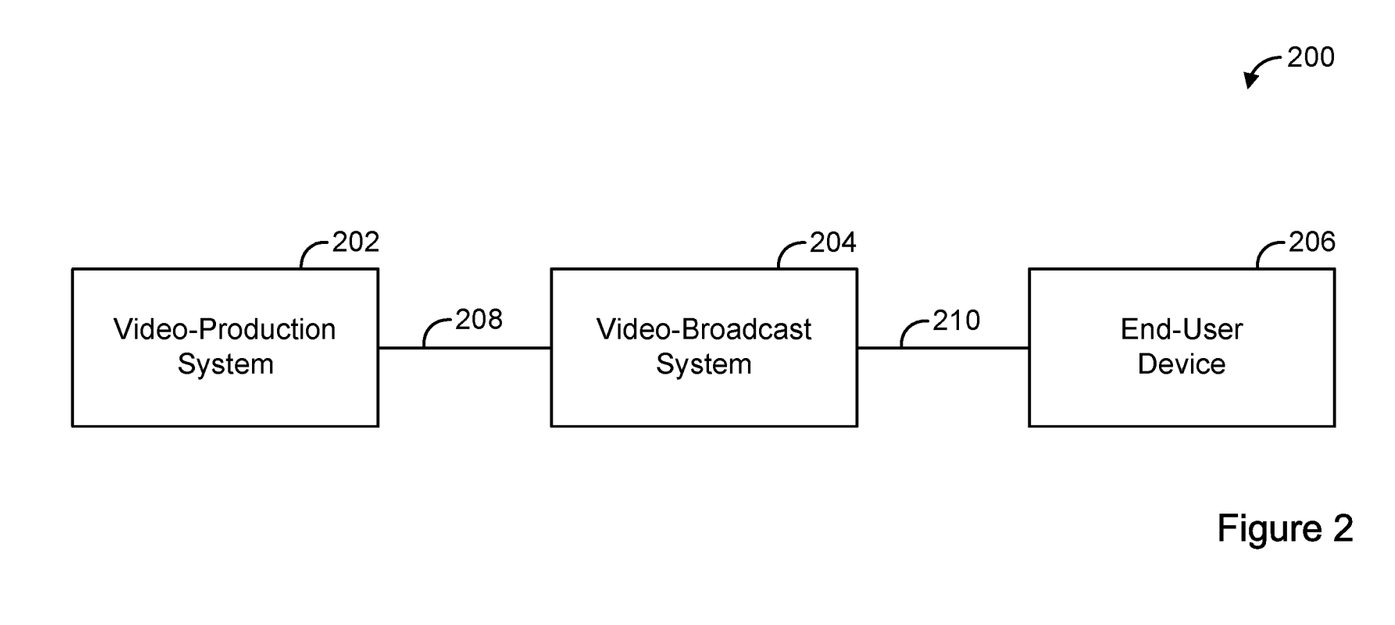
FIG. 2 is a simplified block diagram of an example video system.

FIG. 2 is a simplified block diagram of an example video system 200. The video system 200 can perform various acts and/or functions related to video content, and can be implemented as a computing system. In this disclosure, the term "computing system" means a system that includes at least one computing device. In some instances, a computing system can include one or more other computing systems.

The video system 200 can include various components, such as a VPS 202, a VBS 204, and an end-user device 206, each of which can be implemented as a computing system. The video system 200 can also include a connection mechanism 208, which connects the VPS 202 with the VBS 204; and a connection mechanism 210, which connects the VBS 204 with the end-user device 206.

Figure 3:
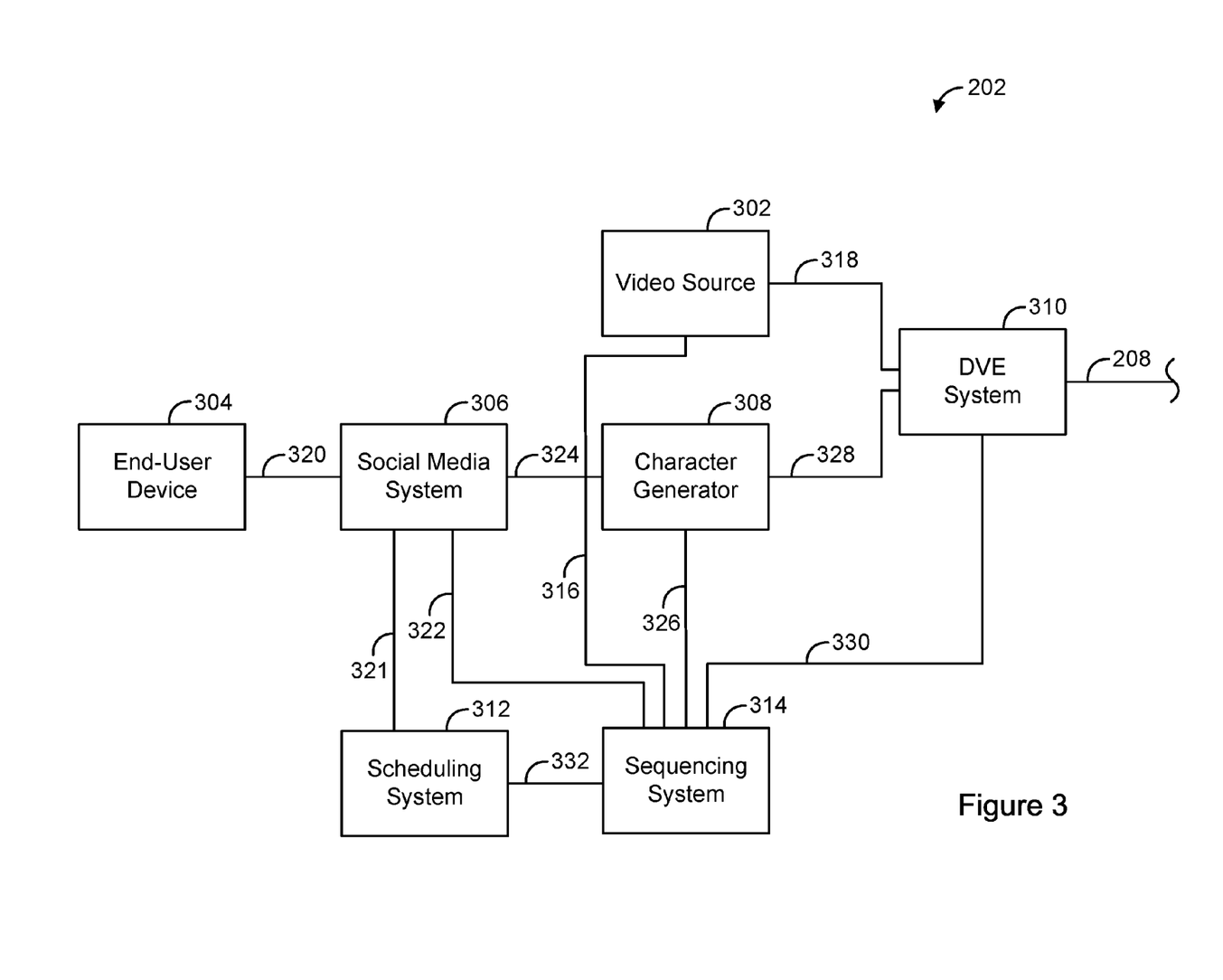
FIG. 3 is a simplified block diagram of an example video production system.

FIG. 3 is a simplified block diagram of an example VPS 202. The VPS 202 can include various components, such as a video source 302, an end-user interface 304, a SM system 306, a character generator 308, a digital video-effect (DVE) system 310, a scheduling system 312, and a sequencing system 314, each of which can be implemented as a computing system. The VPS 202 can also include a connection mechanism 316, which connects the video source 302 with the sequencing system 314; a connection mechanism 318, which connects the video source 302 with the DVE system 310; a connection mechanism 320, which connects the end-user device 304 with the SM system 306; a connection mechanism 321, which connects the SM system 306 with the scheduling system 312; a connection mechanism 322, which connects the SM system 306 with the sequencing system 314; a connection mechanism 324, which connects the SM system 306 with the character generator 308; a connection mechanism 326, which connects the character generator 308 with the sequencing system 314; a connection mechanism 328, which connects the character generator 308 with the DVE system 310; a connection mechanism 330, which connects the DVE system 310 with the sequencing system 314; and a connection mechanism 332, which connects the scheduling system 312 with the sequencing system 314.

The video source 302 can take various forms, such as a video server, a video camera, a satellite receiver, a character generator, or a DVE system. An example video server is the K2 server provided by Grass Valley of San Francisco, Calif.

The character generator 308 can take various forms. An example character generator is the VIZ TRIO provided by Viz Rt of Bergen, Norway. Another example character generator is CASPAR CG developed and distributed by the Swedish Broadcasting Corporation (SVT).

The DVE system 310 can take various forms, such as a production switcher. An example production switcher is the VISION OCTANE production switcher provided by Ross Video Ltd. of Iroquois, Ontario in Canada.

The scheduling system 312 can take various forms. An example scheduling system is WO TRAFFIC provided by WideOrbit, Inc. of San Francisco, Calif. Another example scheduling system is OSI-TRAFFIC provided by Harris Corporation of Melbourne, Fla.

The sequencing system 314 can take various forms. A sequencing system is sometimes referred to in the industry as a "production automation system."

Referring back to FIG. 2, the VBS 204 can include various components, such as a terrestrial antenna or a satellite transmitter, each of which can be implemented as a computing system.

Each of the video-based entities described in this disclosure can include or be integrated with a corresponding audio-based entity. Also, the video content described in this disclosure can include or be integrated with corresponding audio content.

III. Example Operations

The video system 200 and/or components thereof can perform various acts and/or functions. These features and related features will now be described.

The video system 200 can perform various acts and/or functions related to video content. For example, the video system 200 can receive, generate, output, and/or transmit video content that can serve as or be part of a video program (e.g., a news program). In this disclosure, the act of receiving, generating, outputting, and/or transmitting video content can occur in various ways and/or according to various standards. For example, the act of receiving, outputting, and/or transmitting video content can include receiving, outputting, and/or transmitting a video stream representing the video content, such as over Internet Protocol (IP) or in accordance with the high-definition serial digital interface (HD-SDI) standard. Likewise, the act of generating content can include generating a video stream representing the video content. Also, the act of receiving, generating, outputting, and/or transmitting video content can include receiving, generating, outputting, and/or transmitting an encoded or decoded version of the video content.

The VPS 202 can perform various acts and/or functions related to video content production. For example, the VPS 202 can generate and/or output video content, and can transmit the video content to another entity, such as the VBS 204.

Referring back to FIG. 3, within the VPS 202, the video source 302 can generate and/or output video content, and can transmit the video content to another entity, such as the DVE system 310. In practice, the VPS 202 is likely to include multiple video sources and corresponding connection mechanisms, each connecting a respective one of the video sources with the DVE system 310.

As noted above, the video source 302 can take the form of a video server. A video server can record and/or store video content (e.g., in the form of a file). Further, the video server can retrieve stored video content and can use the retrieved video content to generate and/or output a video stream representing the video content. This is sometimes referred to in the industry as the video server playing out the video content. The video server can then transmit the video stream, thereby transmitting the video content, to another entity, such as the DVE system 310.

The SM system 306 can perform various acts and/or functions related to SM content. In this disclosure, "SM content" is content that has been published on a SM platform, which is a computer-based tool that allows users to create, share, and/or exchange content (e.g., in the form of text, images, and/or videos) in virtual communities on a computer-based network such as the Internet. Examples of SM platforms include TWITTER, YOUTUBE, FACEBOOK, PERISCOPE, INSTAGRAM, MEERKAT, LINKEDIN, and GOOGLE+.

SM content has become a prominent and influential source of news and entertainment content. Indeed, SM platforms are more and more often a news-breaking source of information. It can thus be beneficial for video content providers to incorporate SM content items into a video program.

However, video content providers can encounter a number of technological challenges that make it difficult to incorporate SM content items into a video program. For example, receiving, modifying, and integrating SM content items into a video program is generally a time-consuming and labor-intensive process using conventional computing systems and technology platforms. This can be particularly problematic in the context of a news program in which it may be beneficial to quickly receive, modify, and integrate a SM content item into the news program.

The VPS 202 can overcome these and other technological challenges. Among other things, the VPS 202 can provide technological solutions that allow SM content items to be received, modified, and integrated into a video program in an efficient and timely manner. The described technical solutions can also provide numerous other benefits, which will be apparent from this disclosure.

In line with the discussion above, the SM system 306 can receive a SM content item and can do so in various ways. For example, the SM system 306 can receive a SM content item by obtaining it from another entity, such as a SM platform. In one example, the SM system 306 can obtain a SM content item directly from a SM platform. In another example, the SM system can obtain a SM content item from a SM platform via a SM dashboard application (e.g., TWEETDECK, CYFE, or HOOTSUITE). In some instances, a SM dashboard application can provide additional searching and browsing functionalities (e.g., based on trend analysis or analytics) that may not be provided by the SM platform itself, and/or can provide access to multiple SM platforms through a single user interface.

A SM content item can include various elements such as (i) data indicating the SM platform from which the SM content item was received, (ii) data identifying the publisher of the SM content item (e.g., an account identifier, such as a username), (iii) a profile image corresponding to the publisher of the SM content item, (iv) text published by the publisher in connection with the SM content item, (v) an image published by the publisher in connection with the SM content item, (vi) audio content published by the publisher in connection with the SM content item, (vii) video content published by the publisher in connection with the SM content item (viii) a timestamp indicating a time and/or date at which the SM content item was published on the SM platform, (ix) a location (e.g., represented by global positioning system (GPS) coordinates) of the publisher when the SM content item was published, (x) a location at which an aspect of the SM content item occurred (e.g., where video content was recorded or where a photograph was taken), (xi) a timestamp indicating when an aspect of the SM content item occurred, (xii) a number of other users associated with the publisher on a SM platform (e.g., a number of friends or followers), (xiii) an indication of how long the publisher has been a user of a SM platform, (xiv) a number of times the SM content item has been shared (e.g., retweeted) by other users of a SM platform, (xv) a number of posts by the publisher on a SM platform, and/or (xvi) any other data that can be integrated into a video program.

The SM system 306 can also store, select, and/or retrieve a SM content item, perhaps based on input received from a user (e.g., a producer or technical director) via a user interface. As such, the SM system 306 can store an obtained SM content item in a data storage unit (e.g., a data storage unit of the SM system 306), and can then receive the SM content item by selecting and retrieving it from the data storage unit.

The SM system 306 can also modify a SM content item and can do so in various ways. In one example, the SM system 306 can modify a SM content item by adding an element to the SM content item. For instance, the SM system 306 can add a unique identification (ID) number to a stored SM content item to facilitate managing the stored SM content item. In another example, the SM system 306 can modify a SM content item by removing an element of the SM content item or modifying an element of the SM content item. Among other things, this can allow the SM system 306 to removing vulgarities, personal information, and/or extraneous information that is not suitable or desirable for integration into a video program.

The SM system 306 can also transmit a SM content item to another entity, such as the character generator 308.

The character generator 308 can use a character generator template and content to generate and/or output video content that includes the content. The character generator template specifies the manner in which the character generator 308 uses the content to generate and/or output the video content. The character generator 308 can create and/or modify a character generator template, perhaps based on input received from a user via a user interface. Further, the character generator 308 can store, select, and/or retrieve a character generator template, perhaps based on input received from a user via a user interface. As such, the character generator 308 can store a character generator template in a data storage unit (e.g., a data storage unit of the character generator 308), and can then receive the character generator template by retrieving it from the data storage unit.

The character generator 308 can also receive content in various ways. For example, the character generator 308 can receive content by receiving it from another entity, such as the SM system 306. In another example, the character generator 308 can receive content by selecting and retrieving it from a data storage unit (e.g., a data storage unit of the SM system 306).

The character generator template can specify how the character generator 308 is to receive content. In one example, the character generator template can do so by specifying that the character generator 308 is to receive content on a particular input of the character generator 308 (e.g., an input that maps to a particular entity, such as the SM system 306). In another example, the character generator template can do so by specifying that the character generator 308 is to receive content by retrieving it from a particular location of a particular data storage unit (e.g., a data storage unit of the character generator 308).

In one example, the character generator 308 can use an ordered set of content items to generate video content that includes the content items in the specified order. This type of generated video content is sometimes referred to in the industry as a "ticker." The content items can include various types of content, such as text and/or images. In one example, each of these content items can be a SM content item. The ordered set of content items can be stored in various forms, such as in the form of an Extensible Markup Language (XML) file.

After the character generator 308 generates and/or outputs video content, the character generator 308 can transmit the video content to another entity, such as the DVE system 310, and/or can store the video content in a data storage unit (e.g., a data storage unit of the character generator 308).

As such, in one example, the character generator 308 can receive a SM content item, can use the SM content item to generate and/or output video content that includes the SM content item, and can transmit the video content to the DVE system 310.

The DVE system 310 can use a DVE template to generate and/or output video content. This is sometimes referred to in the industry as the DVE system "executing a DVE." In some instances, the DVE system 310 can execute multiple DVEs in serial or overlapping fashion.

The DVE template specifies the manner in which the DVE system 310 generates and/or outputs video content. The DVE system 310 can create and/or modify a DVE template, perhaps based on input received from a user via a user interface. Further, the DVE system 310 can store and/or retrieve a DVE template, perhaps based on input received from a user via a user interface. As such, the DVE system 310 can store a DVE system template in a data storage unit (e.g., a data storage unit of the DVE system 310), and can then receive the DVE template by selecting and retrieving it from the data storage unit.

In some instances, the DVE system 310 can use the DVE template and content to generate and/or output video content that includes the content. The DVE system 310 can receive content in various ways. For example, the DVE system 310 can do so by receiving it from another entity, such as the video source 302 and/or the character generator 308. In another example, the DVE system 310 can do so by selecting and retrieving it from a data storage unit (e.g., a data storage unit of the DVE system 310).

The DVE template can specify how the DVE system 310 is to receive content. In one example, the DVE template can do so by specifying that the DVE system 310 is to receive content on a particular input of the DVE system 310 (e.g., an input that maps to a particular entity, such as the video source 302 or the character generator 308). In another example, the DVE template can do so by specifying that the DVE system 310 is to receive content by retrieving it from a particular location of a particular data storage unit (e.g., a data storage unit of the DVE system 310).

A DVE template can be configured in various ways, which can allow the DVE system 310 to execute various types of DVEs. In one example, a DVE template can specify that the DVE system 310 is to receive video content from the video source 302 and other content (e.g., local weather content) from a data storage unit of the DVE system, and is to overlay the other content on the video content, thereby generating a modified version of the video content. As such, in one example, the DVE system 310 can generate video content by modifying video content.

Figure 4A:
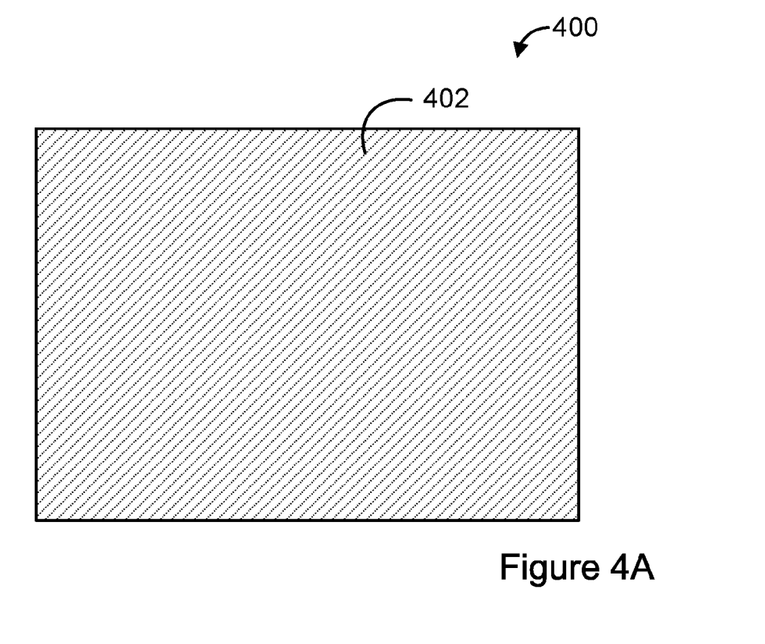
FIG. 4A is a simplified diagram of an example frame of video content, without content overlaid thereon.
Figure 4B:
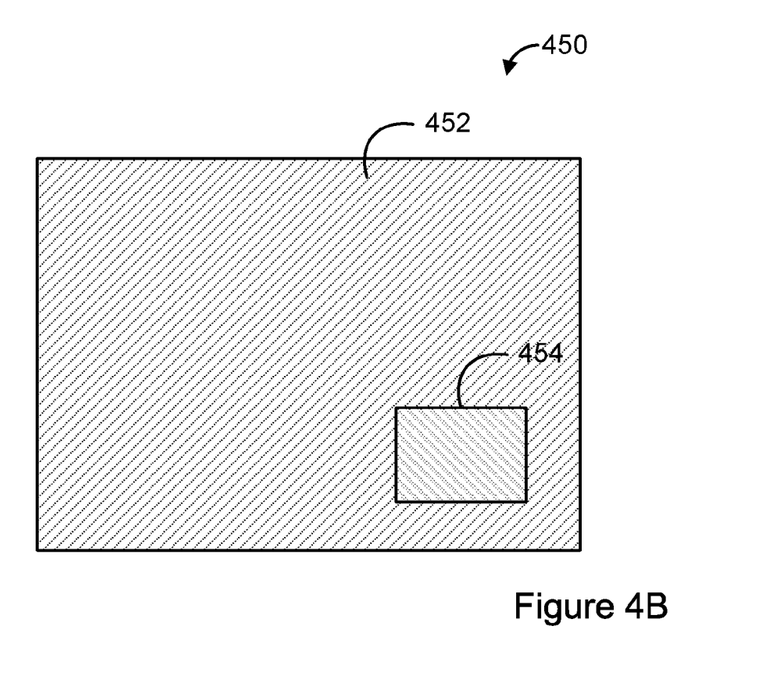
FIG. 4B is a simplified diagram of an example frame of video content, with content overlaid thereon.

FIGS. 4A and 4B help illustrate this concept of overlaying other content on video content. FIG. 4A is a simplified depiction of an example frame 400 of video content. Frame 400 includes content 402, but does not include other content overlaid on content 402. For comparison, FIG. 4B is a simplified depiction of another example frame 450 of video content. Frame 450 includes content 452 and other content 454 overlaid on content 452.

In another example, a DVE template can specify that the DVE system 310 is to receive first video content from the video source 302 and second video content from the character generator 308, and is to overlay the second video content on the first video content, thereby generating a modified version of the first video content.

In another example, a DVE template can specify that the DVE system 310 is to receive first video content from the video source 302 and second video content from the character generator 308, and is to scale-down and re-position the first video content and the second video content, each in a respective one of two windows positioned side-by-side. As such, the DVE system 310 can generate video content by scaling and/or re-positioning video content.

After the DVE system 310 generates and/or outputs the video content, the DVE system 310 can transmit the video content to another entity, such as the VBS 204, or can store the video content in a data storage unit (e.g., a data storage unit of the DVE system 310).

As such, in one example, the DVE system 310 can receive first video content including a SM content item, can use the first video content to generate and/or output second video content that includes the SM content item. This is an example way in which the VPS 202 can integrate a SM content item into a video program.

The VPS 202 can also integrate a SM content item into a video program in other ways. For example, in the case where the video source 302 is a video camera, the SM system 306 can include a display device that is located within a field of the view of the video camera while the video camera records video content that serves as or is made part of the video program. In one example, the display device can be touch-enabled, which can allow a user (e.g., a news anchor) to interact with the SM content item. To facilitate the user's interaction with the SM content item, the display device and/or other components of the SM system 306 can be programmed with instructions that cause particular actions in response to particular touch commands.

In one example, the display device can initially display multiple small tiles, each representing a different SM content item. In this example, the SM content items can relate to weather conditions captured in photographs published on SM platforms by various different publishers. As such, each tile can display a different photograph. The position and ordering of the small tiles can be determined by a character generator template and/or a DVE template. Either template can also include programming instructions that can allow the commands provided via the touch screen display to cause predefined actions for the displayed SM content items. For example, if a meteorologist taps on one of the small items a first time, the programming instructions can cause the tile to expand to enlarge the photograph and perhaps display additional elements of, or information associated with, the SM content item (e.g., a username, time, location, and/or text published in connection with the SM content item). Other commands can cause an expanded tile to return to its initial size and position. As the meteorologist interacts with the SM content items displayed on the display device, the video camera can generate video content including these interactions and thereby integrate the SM content items into the video program.

The scheduling system 312 can perform various acts and/or functions related to the scheduling of video content production. For example, the scheduling system 312 can create and/or modify a program schedule of a video program, perhaps based on input received from a user via a user interface. Further, the scheduling system 312 can store and/or retrieve a program schedule, perhaps based on input received from a user via a user interface. As such, the scheduling system 312 can store a program schedule in a data storage unit (e.g., a data storage unit of the scheduling system 312), and can then receive the program schedule by selecting and retrieving it from the data storage unit. The scheduling system 312 can also transmit a program schedule to another entity, such as the sequencing system 314.

The sequencing system 314 can process records in the program schedule. This can cause the sequencing system 314 to control one or more other components of the VPS 202 to facilitate the VPS 202 generating and/or outputting video content, which can serve as or be part of a video program. For example, the sequencing system 314 can control the video source 302, the SM system 306, the character generator 308, and/or the DVE system 310 to perform the various acts and/or functions described in this disclosure.

The sequencing system 314 can receive a program schedule in various ways. For example, the sequencing system 314 can do so by receiving it from another entity, such as the scheduling system 312. In another example, the character generator 308 can do so by selecting and retrieving it from a data storage unit (e.g., a data storage unit of the scheduling system 312).

A program schedule (sometimes referred to in the industry as a "rundown") serves as a schedule or outline of a video program and can include multiple records. A video program can be conceptually divided into multiple logically-separated portions (sometimes referred to in the industry as "stories"). As such, each portion of the video program can be represented by a separate record of the program schedule. In some cases, each record can also include one or more sub-records. Each record (including a sub-record) can include various types of data.

Figure 5:
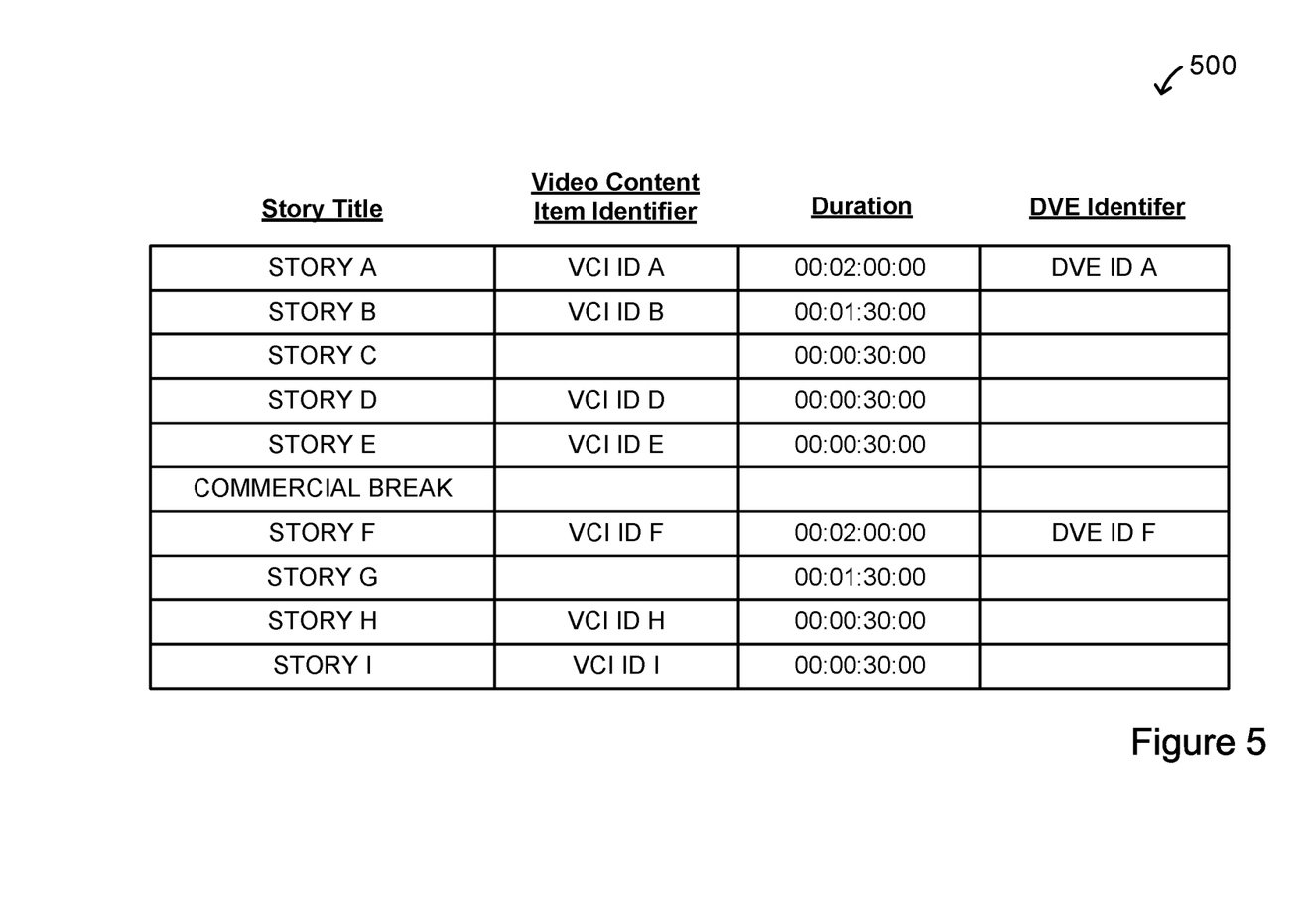
FIG. 5 is a simplified block diagram of an example program schedule.

FIG. 5 is a simplified diagram of an example program schedule 500. The program schedule 500 includes ten records represented as ten ordered rows. Each record corresponds to a respective portion of a video program, except for one which corresponds to a commercial break. For each portion, the respective record specifies at least one element that corresponds to that portion of the video program. In particular, each record specifies at least one of a description, a video content item identifier, a duration, and a DVE identifier (which can serve as an instruction to execute the identified DVE).

A video content item can consist of logically-related video content. For example, a video content item can be a commercial. As another example, a video content item can be a portion of a television program that is scheduled between two commercial breaks. This is sometimes referred to in the industry as a "program segment."

As shown in FIG. 5, the first record specifies a description of STORY A, a video content identifier of VCI ID A, a duration of 00:02:00:00 (in hours::minutes::seconds::frames format), and a DVE identifier of DVE ID A. As such, upon the sequencing system 314 processing the first record, the sequencing system 314 can cause the video source 302 to playout a video content item identified by the identifier VCI ID A for two minutes, and can further cause the DVE system 310 to execute a DVE identified by the identifier DVE ID A, which for example, can cause the DVE system 310 to overlay content on the identified video-content item.

The program schedule 500 has been greatly simplified for the purposes of illustrating certain features. In practice, a program schedule is likely to include significantly more data. For example, instead of a description of a record being STORY A, the description can include a more detailed description such as HIGHLIGHTS OF PRESIDENTIAL DEBATE BETWEEN JOHN SMITH AND JANE DOE. In addition, a record of a program schedule can include other types of data.

In addition, a record of a program schedule can include or refer to other types of data. For example, a record can include or refer to text scheduled to be provided to a teleprompter so that it can be read aloud by a news anchor. As another example, a record can include text that is scheduled to be used by the DVE system 310 in connection with executing a DVE. For instance, the record can include a person's name that the DVE system 310 is scheduled to overlay on other video content.

As yet another example, the record can include or refer to a video content item and corresponding metadata for that video content item. The metadata can specify various types of information, such as data identifying a location (e.g., represented by GPS coordinates) where the video content item was recorded or data indicating a time and/or date when the video content item was recorded.

In some instances, the sequencing system 314 can process a next record in the program schedule based on a trigger event. In one example, the trigger event can be the sequencing system 314 completing one or more actions related to a current record in the program schedule. In another example, the trigger event can be the sequencing system 314 receiving input from a user via a user interface.

Referring back to FIG. 2, the VBS 204 can receive video content from the VPS 202, which in turn can transmit the video content to the end-user device 206 for presentation of the video content to an end user. In practice, the VBS 204 can transmit video content to a large number of end-user devices for presentation of the video content to a large number of end users. The VBS 204 can transmit video content to the end-user device 206 in various ways. For example, VBS 204 can transmit video content to the end-user device 206 over-the-air or via a packet-based network such as the Internet. The end-user device 206 can receive video content from the VBS 204, and can present the video content to an end user via a user interface.

As noted above, the VPS 202 can use a program schedule to facilitate the process of generating and/or outputting a video program. However, the VPS 202 can also use the program schedule for other purposes, such as to provide features related to SM accounts.

A SM user can establish a SM account with a SM platform. Among other things, this can allow the SM user to publish a SM content item on the SM platform through the SM account. In some instances, the SM user can configure the SM account by modifying one or more settings of the SM account. For instance, the SM user can specify whether and to what extent the SM content items published through the SM account are to be available to the public and/or to other SM users of the SM platform. A SM account can be identified in various ways, such as with a username or an account number.

In some cases, a first SM account can be linked with a second SM account. The link can be established in various ways. For example, a first SM user associated with the first SM account can cause a SM platform to request a second SM user associated with the second SM account to authorize a link between the first and second SM accounts. The link request (and related concepts) can be referred to in various ways depending on the associated SM platform. For instance, in the case where the SM accounts are FACEBOOK accounts, the request may be referred to as a "friend request." Alternatively, in the case where the SM accounts are TWITTER accounts, the request may be referred to as a "follower request." Responsive to the second SM user authorizing the link, the SM platform can establish the link. The SM platform can maintain a database that tracks the status of requests, authorized links, and other related data.

As a result of a first SM account being linked to a second SM account, certain options may become available to or both of the SM accounts and/or their respective users. To illustrate this, consider an example in which a first SM user has a first SM account, and through the first SM account, the first SM user publishes two SM content items. The first SM user can configure the first SM account such that a first of the two SM content items is made available to any SM user who accesses the SM platform, and such that a second of the two SM content items is made available only to SM users who have a SM account that is linked with the first SM account. Thus, in the case where a second SM user has a second SM account that is not linked with the first SM account, the second SM user may have access to the first SM content item, but not the second SM content item. But if the SM platform links the first and second SM accounts, the second SM user can then gain access to the second SM content item through the SM platform.

Linked SM accounts can provide other options as well. For example, a link between two SM accounts can enable certain types of communication options between the SM accounts and/or between their respective SM users.

As noted above, the VPS 202 can use the program schedule to provide features related to SM accounts. In one example, the VPS 202 can use a program schedule to select a SM content item, and to facilitate the process of establishing a link between a first SM account associated with the selected SM content item, and a second SM account, which can be associated with the VPS 202 (or a user thereof). This can allow the VPS 202 to gain access to additional potentially relevant SM content items, which the VPS 202 can integrate into a video program as described above.

In the context of providing such features, the SM system 306 can perform various acts and/or functions, such as those described below. To begin with, the SM system 306 can access data associated with a program schedule. The SM system 306 can access this data in various ways, such as by receiving it from another entity, such as the scheduling system 312. In another example, the SM system 306 can access the data by selecting and retrieving it from a data storage unit (e.g., a data storage unit of the scheduling system 312).

The accessed data can be data that is included in or referred to by a program schedule and can identify or otherwise relate to various types of information, such as a person, place, event, or topic. In one example, the accessed data can be a description element of a record of a program schedule. In another example, the accessed data can be text scheduled to be provided to a teleprompter. As another example, the accessed data can be text that is scheduled to be used by the DVE system 310 in connection with executing a DVE. As another example, the accessed data can be video content item metadata that indicates a location (e.g., represented by GPS coordinates) where the video content item was recorded or data indicating a time and/or date when the video content item was recorded.

Based on the accessed data, the SM system 306 can select a SM content item that was published by a first SM user associated with a first SM account. By using data associated with a program schedule as a basis to select a SM content item, the SM system 306 can select a SM content item that relates to a video program that the VPS 202 is scheduled to produce. For example, in the case where the video program is a news program, the SM system 306 can select a SM content item that relates to a particular story of a news program that is soon to be produced.

As noted above, based on the accessed data, the SM system 306 can select a SM content item. In one example, the SM content item can include data, and the SM system 306 can select the SM content item based on the accessed data having a threshold extent of similarity with the data of the SM content item.

The data of the SM content item can be an element of a SM content item, and can identify or otherwise relate to various types of information, such as a person, place, event, or topic. For example, the data can be text published by a publisher in connection with the SM content item. As another example, the data can identify a location (e.g., represented by GPS coordinates) of the publisher when the SM content item was published or a location at which an aspect of the SM content item occurred (e.g., where video content was recorded or where a photograph was taken). As another example, the data can identify a time and/or date at which the SM content item was published on a corresponding SM platform, or a timestamp identifying when an aspect of the SM content item occurred.

As noted above, the SM system 306 can select the SM content item based on the accessed data having a threshold extent of similarity with the data of the SM content item. The threshold extent can be predefined in various ways to suit a desired configuration as illustrated below. For example, in the case where the accessed data takes the form of the text JOHN SMITH and the SM content item includes data that takes the form of the text JOHN SMITH, the SM system 306 can select the SM content item based on the accessed data and the data of the SM content item data being identical.

As another example, in the case where the accessed data takes the form of the text JOHN SMITH and the SM content item includes data that takes the form of the text JON SMITH, the SM system 306 can select the SM content item based on the accessed data and the data of the SM content item being sufficiently similar despite not being identical. This can help the SM system 306 identify a first word that is a misspelling of a second word, for instance. For this purpose, the SM system 306 can directly or indirectly use any text comparison and scoring techniques now known in the art or later discovered.

As another example, in the case where the accessed data takes the form of the text JOHN SMITH and the SM content item includes data that takes the form of the text VICE PRESIDENT, (where the current vice president is named JOHN SMITH), the SM system 306 can select the SM content item based on the accessed data and the data of the SM content item being semantically similar.

As another example, in the case where the accessed data takes the form of data identifying a location of Los Angeles, Calif. and the SM content item includes data identifying a location of Los Angeles, Calif., the SM system 306 can select the SM content item based on the two identified locations being identical.

As another example, in the case where the accessed data takes the form of data identifying a location of Los Angeles, Calif. and the SM content item includes data identifying a location of Orange County, Calif., the SM system 306 can select the SM content item based on the two locations being sufficiently close to one another (e.g., less than 50 miles apart).

As another example, in the case where the accessed data takes the form of data identifying a date and the SM content item includes data identifying the same date, the SM system 306 can select the SM content item based on the two dates being identical.

As another example, in the case where the accessed data takes the form of data identifying a first time and the SM content item includes data identifying a second time, the SM system 306 can select the SM content item based on the two times being sufficiently close to one another (e.g., less than 48 hours apart).

For the purpose of determining that the accessed data and the data of the SM content item have a threshold extent of similarity, the SM system 306 can directly or indirectly use any data analysis, comparison, and/or matching techniques now known in the art or later discovered. Such a technique could include, for example, a text comparison and scoring technique. Also, in some instances, the SM system 306 can consider various combinations of different types of accessed data and types of data of a SM content item in determining which SM content item to select.

Responsive to selecting the SM content item, the SM system 306 can cause the SM platform to request the first SM user to authorize a link between the first SM account and a second SM account. The SM system 306 can cause the SM platform to do this in various ways. For example, the system 306 can do by transmitting an instruction to a server of the SM platform. In this case, the server can receive the instruction, and responsive to receiving the instruction, the server can request the first SM user to authorize the link between the first SM account and the second SM account.

After the first SM user authorizes the link, the server can transmit to the SM system 306 an indication that the first SM user authorized the link between the first SM account and the second SM account. The SM system 306 can receive this instruction, and responsive to receiving it, the SM system 306 can perform an action. For example, the SM system 306 can obtain a SM content item published through the first SM account, and that became accessible as a result of the link being established. The VPS 202 can then integrate the SM content item into a video program as described above.

Although some of the acts and/or functions described in this disclosure have been described in the context of the video system 200 and as video-related concepts (e.g., generating a video program), the acts and/or functions can also be applied in the context of an audio system and used as audio-related concepts (e.g., generating an audio program). More generally, the acts and/or functions described in this disclosure can be applied in the context of a media system and used as media-related concepts (e.g., generating a media program).

Figure 6:
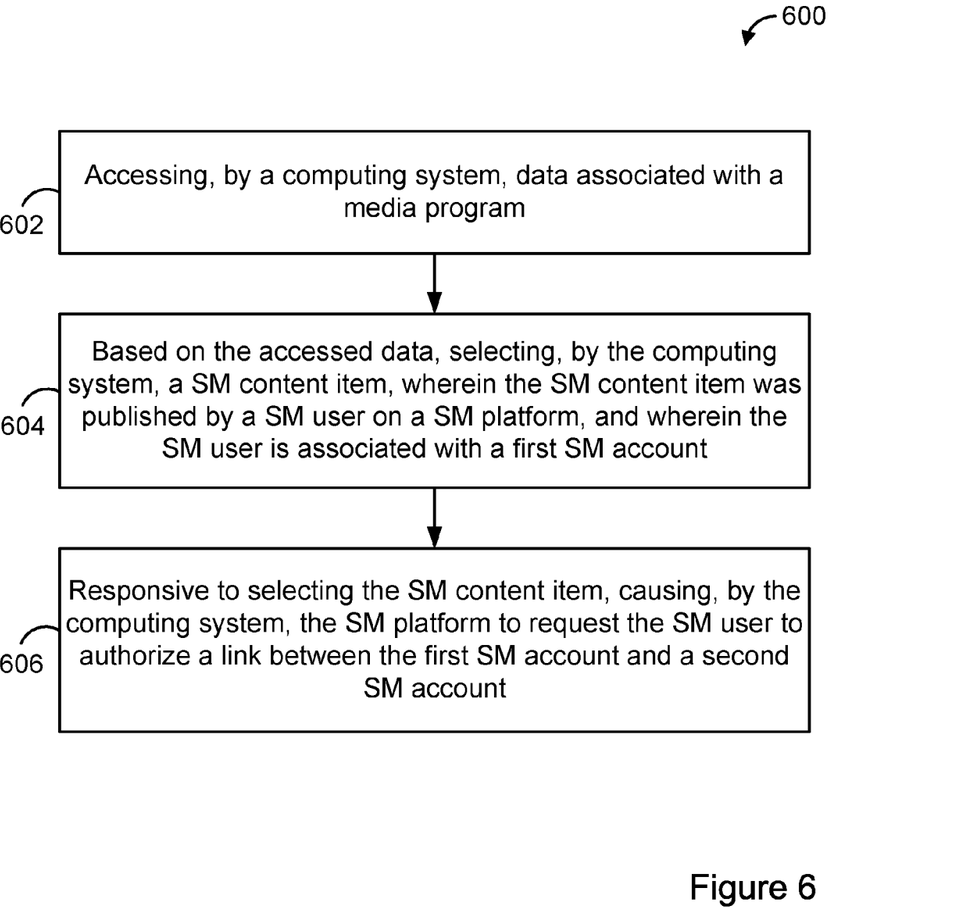
FIG. 6 is a flow chart of an example method.

FIG. 6 is a flow chart illustrating an example method 600.

At block 602, the method 600 can include accessing, by a computing system, data associated with a media (e.g., audio and/or video) program.

At block 604, the method 600 can include based on the accessed data, selecting, by the computing system, a SM content item, wherein the SM content item was published by a SM user, and wherein the SM user is associated with a first SM account.

At block 606, the method 600 can include responsive to selecting the SM content item, causing, by the computing system, a SM platform to request the SM user to authorize a link between the first SM account and a second SM account.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more example of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
   accessing, by a computing system, data associated with a program schedule for a media program;
   based on the accessed data, selecting, by the computing system, a social media (SM) content item, wherein the SM content item was published by a SM user, and wherein the SM user is associated with a first SM account; and
   responsive to selecting the SM content item, causing, by the computing system, a SM platform to request the SM user to authorize a link between the first SM account and a second SM account,
   wherein the accessed data relates to a person, place, event, or topic,
   wherein the SM content item includes data relating to a person, place, event, or topic, and
   wherein selecting the SM content item comprises selecting the SM content item based on the accessed data having a threshold extent of similarity with the data of the SM content item.

2. The method of claim 1, wherein the computing system is a component of a media production system.

3. The method of claim 1, wherein the accessed data comprises data included in the program schedule.

4. The method of claim 1, wherein the accessed data comprises data selected from the group consisting of:
   (i) text that is a description element of a record of the program schedule;
   (ii) text scheduled to be provided to a teleprompter;
   (iii) text that is scheduled to be used by a digital-video effect (DVE) system in connection with executing a DVE;
   (iv) data identifying a location where a video content item was recorded; and
   (v) data identifying a time when a video content item was recorded.

5. The method of claim 1, wherein causing the SM platform to request the SM user to authorize the link between the first SM account and the second SM account comprises transmitting an instruction to a server of the SM platform, wherein the server is configured for (i) receiving the instruction, and (ii) responsive to receiving the instruction, requesting the SM user to authorize the link between the first SM account and the second SM account.

6. The method of claim 1, further comprising:
   receiving, by the computing system, an indication that the SM user authorized the link between the first SM account and the second SM account.

7. The method of claim 6, further comprising:
   responsive to receiving the indication that the SM user authorized the link between the first SM account and the second SM account, performing, by the computing system, an action.

8. The method of claim 7, wherein performing the action comprises:
   accessing, by the computing system, an additional SM content item published through the first SM account; and
   integrating, by the computing system, the additional SM content item into the media program.

9. A non-transitory computer-readable medium having stored thereon program instructions that upon execution by a processor, cause performance of a set of acts comprising:
   accessing, by a computing system, data associated with a program schedule for a media program;
   based on the accessed data, selecting, by the computing system, a social media (SM) content item, wherein the SM content item was published by a SM user, and wherein the SM user is associated with a first SM account; and
   responsive to selecting the SM content item, causing, by the computing system, a SM platform to request the SM user to authorize a link between the first SM account and a second SM account,
   wherein the accessed data relates to a person, place, event, or topic,
   wherein the SM content item includes data relating to a person, place, event, or topic, and
   wherein selecting the SM content item comprises selecting the SM content item based on the accessed data having a threshold extent of similarity with the data of the SM content item.

10. The non-transitory computer-readable medium of claim 9, wherein the computing system is a component of a media production system.

11. The non-transitory computer-readable medium of claim 9, wherein the accessed data comprises data included in the program schedule.

12. The non-transitory computer-readable medium of claim 9, wherein the accessed data comprises data selected from the group consisting of:
   (i) text that is a description element of a record of the program schedule;
   (ii) text scheduled to be provided to a teleprompter;
   (iii) text that is scheduled to be used by a digital-video effect (DVE) system in connection with executing a DVE;
   (iv) data identifying a location where a video content item was recorded; and
   (v) data identifying a time when a video content item was recorded.

13. The non-transitory computer-readable medium of claim 9, wherein causing the SM platform to request the SM user to authorize the link between the first SM account and the second SM account comprises transmitting an instruction to a server of the SM platform, wherein the server is configured for (i) receiving the instruction, and (ii) responsive to receiving the instruction, requesting the SM user to authorize the link between the first SM account and the second SM account.

14. The non-transitory computer-readable medium of claim 9, the set of acts further comprising:
   receiving, by the computing system, an indication that the SM user authorized the link between the first SM account and the second SM account.

15. The non-transitory computer-readable medium of claim 14, the set of acts further comprising:
   responsive to receiving the indication that the SM user authorized the link between the first SM account and the second SM account, performing, by the computing system, an action.

16. The non-transitory computer-readable medium of claim 15, the set of acts further comprising:
   accessing, by the computing system, an additional SM content item published through the first SM account; and
   integrating, by the computing system, the additional SM content item into the media program.

17. A computing system configured for performing a set of acts comprising:
   accessing, by the computing system, data associated with a program schedule for a media program;
   based on the accessed data, selecting, by the computing system, a social media (SM) content item, wherein the SM content item was published by a SM user, and wherein the SM user is associated with a first SM account; and
   responsive to selecting the SM content item, causing, by the computing system, a SM platform to request the SM user to authorize a link between the first SM account and a second SM account,
   wherein the accessed data relates to a person, place, event, or topic,
   wherein the SM content item includes data relating to a person, place, event, or topic, and
   wherein selecting the SM content item comprises selecting the SM content item based on the accessed data having a threshold extent of similarity with the data of the SM content item.

18. The computing system of claim 17, wherein the computing system is a component of a media production system.

19. The computing system of claim 17, wherein the accessed data comprises data included in the program schedule.

20. The computing system of claim 17, wherein the accessed data comprises data selected from the group consisting of:
   (i) text that is a description element of a record of the program schedule;
   (ii) text scheduled to be provided to a teleprompter;
   (iii) text that is scheduled to be used by a digital-video effect (DVE) system in connection with executing a DVE;
   (iv) data identifying a location where a video content item was recorded; and
   (v) data identifying a time when a video content item was recorded.

* * * * *